Oct. 9, 1928.

H. H. IDE 1,686,814

CONDENSER

Filed June 7, 1924

Inventor.
Harry H. Ide.
By Curtis Camp
Attorney.

Patented Oct. 9, 1928.

1,686,814

UNITED STATES PATENT OFFICE.

HARRY H. IDE, OF LA GRANGE, ILLINOIS, ASSIGNOR TO KELLOGG SWITCHBOARD AND SUPPLY COMPANY, OF CHICAGO, ILLINOIS, A CORPORATION OF ILLINOIS.

CONDENSER.

Application filed June 7, 1924. Serial No. 718,424.

My invention relates to condensers such as are used in radio or wireless circuits and an object or feature of my invention is the provision of a small variable condenser in combination with a large or main variable condenser. In my construction I utilize one of the plates of the stator element of the main variable condenser for a plate of my small variable condenser, the other plate of said small condenser being micrometrically adjustable so that a desired capacity of said small variable condenser may be obtained. By having the small condenser adjustable so that a certain capacity value of the same may be obtained, a greater degree of efficiency of a circuit of a radio or wireless system may be effected.

The movable element of my small condenser may be connected in parallel with the rotatable element of the main condenser so that it operates as means to secure a very fine adjustment of the capacity of the complete unit; that is, the small condenser may be considered as a vernier adjustment of the capacity of the unit; or the condenser unit may be connected in a circuit arrangement so that the stationary element of the unit is connected to a common point in the circuit and the main rotary element connected to one branch of the circuit and the small variable element connected to another branch of the circuit. It is obvious, of course, that if it is desired to use the small variable condenser as a fixed condenser it may be adjusted to the desired capacity and locked in its adjusted position.

The above features of my invention, as well as others, will be more specifically pointed out in the ensuing specification and appended claims and for a clearer understanding of the same, reference may be had to the accompanying drawings.

Referring to the drawings.

Referring now in general to my invention and more particularly to the variable condenser VC, the said condenser comprises a fixed plate element S, commonly referred to as the stator element, and a rotor plate element R which is operatively associated with the said stator element S. The rotor element is rotatably supported on a rotatable shaft H, which may be rotated in a clockwise or counterclockwise direction to adjust the plates of the rotor element R relative to the plates of the stator element S. The rotor element R and stator element S are suitably supported in operative position between a pair of insulation members M and M'.

For a detail description of the construction and of the assemblage of the rotor element R and stator element S and also of the manner in which the same are supported, reference may be had to a co-pending application filed by Ernest A. Bohlman, January 29, 1923, Serial Number 615,501.

Figure 5:
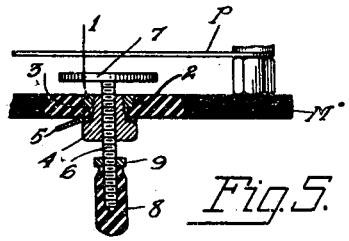
Fig. 5 is a side view of the small adjustable plate of the auxiliary unit of my condenser, showing certain parts thereof in section.
Figure 2:
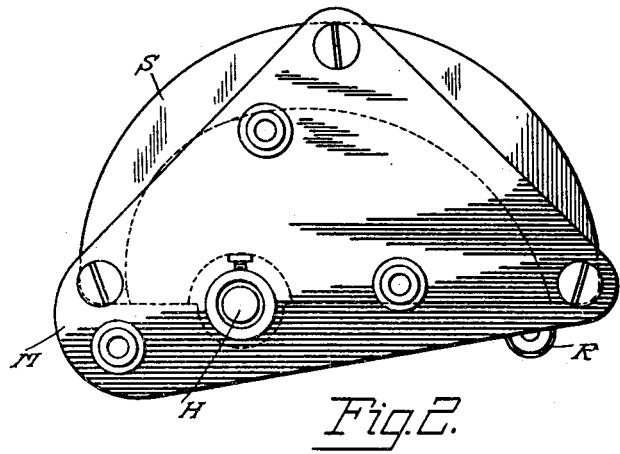
Fig. 2 is a top plan view of Fig. 1.
Figure 3:
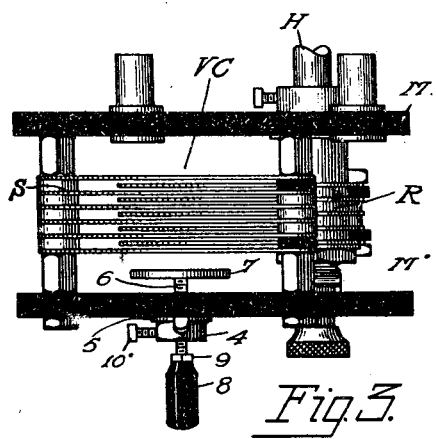
Fig. 3 is a left side view of Fig. 1.
Figure 1:
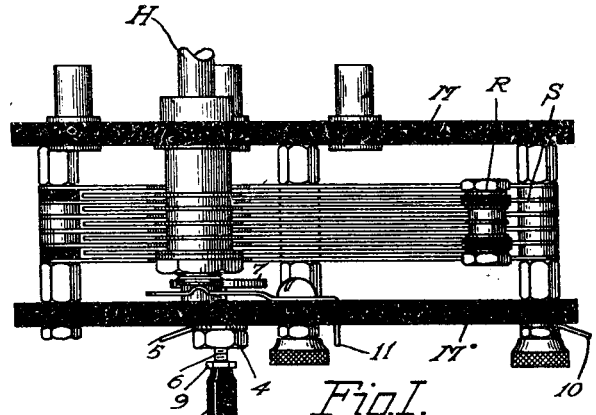
Fig. 1 is an elevation of the condenser of my invention.
Figure 6:
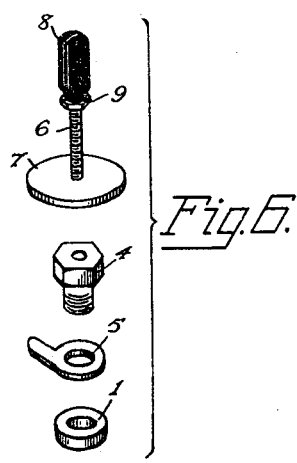
Fig. 6 is a perspective view of the adjustable plate of the auxiliary unit of my condenser and also showing the means for adjusting the same relative to a fixed plate of the condenser unit.
Figure 4:
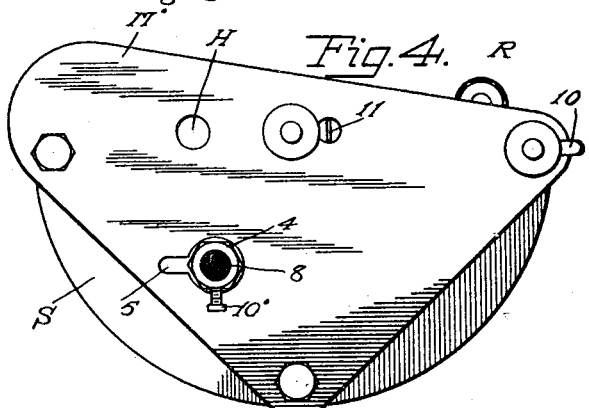
Fig. 4 is a bottom plan view of Fig. 1.

Referring now in detail to my invention as illustrated in the drawings, 1 is a cylindrical member which engages an opening 2 in the mounting member M', and rests upon the circumferential face 3, said cylindrical member 1 being staked over at several places to prevent its rotation relative to the insulation member M'. A tubular member 4 is provided which has its reduced end threaded and adapted to extend into the opening 2 in the member M' and has screw-threaded engagement with the central opening in the cylindrical member 1, which opening 1 is suitably tapped for receiving the threaded end of said member 4. A terminal member 5 is provided which fits over the reduced end of the member 4 and is disposed between the member M' and the hexagonally shaped head of said member 4, and when the member 4 is screwed into the member 1, the terminal 5 will be held in place against rotation. A threaded member 6 is provided which has a metallic disk or plate member 7 suitably secured to its one end, said disk or plate serving as one of the plates of my auxiliary condenser. The threaded member 6 extends through and has screw-threaded engagement with the tapped opening in the tubular member 4, and secured to the other end of the threaded member 6 is a non-conducting member or knob 8 which has screw threaded engagement with said other end and is locked thereon by a lock nut 9. When the different parts shown in Fig. 6 are assembled, as just described above, it will be seen that the disk or plate member 7 will be adjustably positioned parallel to the end plate p of the stator element S of the variable condenser VC, said end plate p serving as the other plate of my fixed condenser.

The terminal 5 is one terminal of the auxiliary or vernier element of my condenser unit, the terminal 10 is connected to the stator part of the condenser unit, and the terminal 11 is connected to the main rotary element of the unit.

To increase or decrease the capacity of my variable fixed condenser to obtain the most efficient operation of the circuit, the turning knob 8 may be turned in a clockwise or counterclockwise direction to bring the adjustable plate 7 closer to or further away from the fixed plate p of the stator element S. When the plate 7 has been adjusted relative to the fixed plate p to obtain the best results, the set screw 10', which has screw-threaded engagement with a suitable opening in the hexagonal shaped head of the member 4, is screwed down so that its end will engage the threaded member 6 whereby the threaded member 6 and plate 7 are held in their adjusted position against movement. The plate 7 has quite a latitude of movement so that the capacity value of my auxiliary condenser may be extensively as well as minutely varied to obtain the correct capacity value which will effect the most efficient operation of the circuit.

From the foregoing it will be at once apparent that I have provided a variable condenser, which has for one of its plates, a plate of the stator element S of the main variable condenser VC, and has its other plate adjustable so that the capacity of said small condenser may be readily altered.

While I have described my invention in connection with a circuit arrangement of a radio or wireless circuit, such description is given only for the sake of explaining my invention and I do not wish to be limited thereby. It is obvious that my invention may be utilized for other purposes than that described. The parts shown in Fig. 6 may be assembled and secured to the insulation member M instead of the member M' so that the turning knob 8 may extend through the mounting panel supporting the variable condenser VC whereby the plate 7 may be adjusted from the front of said panel or the front of the cabinet containing the variable condenser.

While I have described a particular form of my invention it is to be understood that I do not wish to be limited to the exact structure as shown and described, as many changes and modifications will readily suggest themselves, therefore, I intend to cover all that which may come within the spirit and scope of the appended claims.

Having described my invention what I claim as new and desire to secure by United States Letters Patent is:

1. A device of the class described including a stator element comprising a plurality of plates, a rotor element operatively associated with said stator element, end plate members for supporting said stator and rotor elements, and adjustable disk, one of said end plate members adjustably supporting said adjustable disk in operative position relative to one of the plates of said stator element, said one plate and said adjustable disk forming a condenser of a variable capacity.

2. A device of the class described including a variable condenser having a plurality of fixed conducting members, a plurality of movable conducting members operatively and adjustably associated with said fixed members, means including a pair of non-conducting members for supporting said conducting members, another conducting member, means for adjustably supporting said other conducting member on one of said non-conducting members and in operative relation with one of said fixed conducting members, said other conducting member being adjustable to vary the capacity between said other conducting member and said one fixed member.

3. A device of the class described including a variable condenser comprising a plurality of conducting plates, means including a pair of non-conducting members for supporting said conducting plates, a disk, adjustable means for adjustably supporting said disk on one of said non-conducting members and in operable position relative to one of said conducting plates, to form a condenser whose capacity is alterable by moving said disk rectilinearly.

4. A device of the class described including a variable condenser comprising a plurality of conducting members, end plates for supporting said conducting members, another condenser having an adjustable circular plate rotatably supported in one of said end plates, one of said conducting members of said variable condenser forming the other plate of said second condenser, said adjustable circular plate operable relative to said conducting member to alter the capacity of said second condenser.

5. A device of the class described including a plurality of fixed conducting members and a plurality of movable conducting members, means including non-conducting members for supporting said conducting members, another conducting member, means for adjustably supporting said other conducting member on one of said non-conducting members and in operative position with one of said fixed conducting members, said one conducting member and said other conducting member forming a condenser, means for adjusting said other conducting member relative to said one of said fixed conducting members to vary the capacity between said fixed and said adjustable conducting member, and means for holding said other conducting member in its adjusted position independent of said plurality of said movable conducting members, whereby a certain capacity value of said condenser is maintained.

6. A device of the class described including a variable condenser having a plurality of conducting plates, a second condenser having an adjustable plate adjustable in a rectilinear direction, one of said conducting plates forming a plate for said first condenser and also a plate for said second condenser, the capacity of said second condenser being controlled by the rectilinear movement of said adjustable plate.

7. A device of the class described including fixed conducting members and movable conducting members, means including non-conducting members for supporting said fixed and said movable conducting members, another conducting member, means for adjustably supporting said other conducting member on one of said non-conducting members, said other conducting member adjustable in a rectilinear direction relative to one of said fixed conducting members for altering the capacity of said device.

8. A unit of the character described including a stationary plate and a plate rotatable relative thereto, a second plate movable rectilinearly relative to said stationary plate, an adjustable rotatable shaft for supporting said second plate, means for rotating said shaft to impart a rotating and a rectilinear movement to said plate, said second plate and said stationary plate forming a condenser of relatively small capacity.

9. A unit of the character described including a stationary plate and a plate rotatable relative thereto, a second plate movable rectilinearly relative to said stationary plate, an adjustable rotatable shaft for supporting said second plate, means for rotating said shaft to impart a rectilinear movement to said plate, said second plate and said stationary plate forming a condenser of relatively small capacity that may be used as a separate condenser or as a vernier adjustment for the main condenser formed of said stationary plate and said rotatable plate.

10. A unit of the character described including a stationary plate and a plate rotatable relative thereto, a second plate movable rectilinearly relative to said stationary plate, an adjustable rotatable shaft for supporting said second plate, means for rotating said shaft to impart a rotating and a rectilinear movement to said plate, said second plate and said stationary plate forming a condenser of relatively small capacity, and means for locking said second plate in its adjusted position independent of the plate rotatable relative to said stationary plate.

Signed by me at Chicago, in the county of Cook and State of Illinois, this 4th day of June, 1924.

HARRY H. IDE.